(12) United States Patent
Joyce et al.

(10) Patent No.: US 7,744,051 B2
(45) Date of Patent: Jun. 29, 2010

(54) MAGNETIC ATTACHMENT ELEMENT

(75) Inventors: James C. Joyce, Naples, FL (US);
Ronnie D. Kisner, Bradenton, FL (US);
Robert C. Hazzard, Sarasota, FL (US)

(73) Assignee: Mag Clip Corporation, Naples, FL (US)

( * ) Notice: Subject to any disclaimer, the term of this patent is extended or adjusted under 35 U.S.C. 154(b) by 705 days.

(21) Appl. No.: 11/114,944

(22) Filed: Apr. 26, 2005

(65) Prior Publication Data

US 2006/0237605 A1 Oct. 26, 2006

(51) Int. Cl.
*A47B 96/06* (2006.01)

(52) U.S. Cl. ............... 248/220.31; 248/206.5; 248/467

(58) Field of Classification Search ........... 248/206.5, 248/467, 220.31, 220.42, 220.43
See application file for complete search history.

(56) References Cited

U.S. PATENT DOCUMENTS

| | | | |
|---|---|---|---|
| 1,712,473 A | 5/1929 | McWethy | |
| 2,510,634 A | 6/1950 | Hull | |
| 3,141,258 A | 7/1964 | Mayer | |
| 3,405,377 A | 10/1968 | Pierce | |
| 3,483,494 A | 12/1969 | Cromie | |
| 3,609,015 A | 9/1971 | Messinger | |
| 3,723,928 A | 3/1973 | Blakey et al. | |
| 3,726,393 A | 4/1973 | Thompson | |
| 4,337,860 A | 7/1982 | Carrigan | |
| 4,616,796 A | 10/1986 | Inoue | |
| 5,005,590 A | 4/1991 | Eldridge, Jr. et al. | |
| 5,448,806 A * | 9/1995 | Riceman et al. | ........... 24/303 |
| 5,473,799 A | 12/1995 | Aoki | |
| 5,501,342 A | 3/1996 | Geibel | |
| 5,743,394 A | 4/1998 | Martin | |
| 5,848,700 A | 12/1998 | Horn | |
| 5,855,285 A | 1/1999 | Laird et al. | |
| 5,983,464 A * | 11/1999 | Bauer | ........... 24/303 |
| 6,039,178 A | 3/2000 | Ernst | |
| 6,073,766 A | 6/2000 | Winnard | |
| 6,092,655 A | 7/2000 | Ernst | |
| 6,311,838 B1 | 11/2001 | Johnson et al. | |
| 6,431,373 B1 | 8/2002 | Blick | |
| 6,571,966 B1 | 6/2003 | Hsiao | |
| 6,644,617 B2 * | 11/2003 | Pitlor | ........... 248/544 |
| 6,702,112 B1 | 3/2004 | Henderson | |
| 6,892,428 B2 * | 5/2005 | Reiter | ........... 24/303 |
| 6,895,642 B2 * | 5/2005 | Huang | ........... 24/303 |
| 7,131,616 B2 * | 11/2006 | Livingstone | ........... 248/304 |
| 2005/0258059 A1 | 11/2005 | Joyce et al. | |
| 2007/0023304 A1 | 2/2007 | Joyce et al. | |

FOREIGN PATENT DOCUMENTS

| | | |
|---|---|---|
| JP | 06080176 A1 | 3/1994 |
| WO | 9626870 A1 | 9/1996 |

* cited by examiner

*Primary Examiner*—J. Allen Shriver, II
*Assistant Examiner*—Steven M Marsh
(74) *Attorney, Agent, or Firm*—The Webb Law Firm

(57) ABSTRACT

Disclosed is a magnetic attachment element for use in connection with a pegboard having a plurality of pegboard orifices extending through a pegboard body. The magnetic element includes an attachment element body with at least one magnet in operational communication therewith for generating a magnetic force therefrom. The magnetic attachment element also includes at least one connector portion in operational communication with the attachment element in the element body for attaching the attachment element body to the pegboard by engaging the one or more connector portions to one or more of the pegboard orifices. Methods of manufacturing the magnetic attachment element are also disclosed.

33 Claims, 2 Drawing Sheets

MAGNETIC ATTACHMENT ELEMENT

BACKGROUND OF THE INVENTION

1. Field of the Invention

The present invention relates generally to attachment elements and other attachable devices that have a magnetic feature or property and, in particular, to a magnetic attachment element that can be used in connection with or attachable to a pegboard with a plurality of pegboard orifices extending through a pegboard body.

2. Description of Related Art

In order to provide organization to one's work area, some type of system or structural arrangement is often desired. For example, as a person collects tools and tool parts over a period of time, he or she may require some manner of organizing and positioning these tools and parts for easy access and recall. One example of a tool and device is found in U.S. Pat. No. 5,743,394 directed to a magnetic socket holder. While the socket holder disclosed in this reference uses magnetic force, other tool attachment and organization means are known in the art. For example, in a typical tool chest, a slidable drawer with segregated compartments is used. For tool organization structures that hang on the wall and are oriented in a vertical plane, clips or other attachment devices can be used. Examples of other magnet-based organizing systems can be found in U.S. Pat. Nos. 6,039,178; 6,431,373; 6,092,655; 5,855,285; 4,337,860; 3,726,393; 3,405,377; and 1,712,473.

Tool and other similar organization structures that hang on the wall and are oriented in a vertical plane may take many forms. For example, a pegboard, which includes multiple pegboard orifices extending through a pegboard body, can be used to attach clips and other items that have extensions or connectors capable of mating with the pegboard orifices. Such a system becomes configurable, since the clips or hangers may be removed from one pegboard orifice and reoriented in another pegboard orifice, depending upon the size and shape of the item one wishes to hang on the clip or hanger. However, such prior art pegboard arrangements only offer simple clips, hooks and other hangers for attachment to and cooperation with the pegboard orifices. Accordingly, the above-discussed systems and structures have many drawbacks.

SUMMARY OF THE INVENTION

It is, therefore, an object of the present invention to provide a magnetic attachment element that overcomes the deficiencies of the prior art. It is another object of the present invention to provide a magnetic attachment element that can be used in connection with a pegboard having a plurality of pegboard orifices extending through a pegboard body. It is yet another object of the present invention to provide a magnetic attachment element that uses a magnet with sufficient holding power to removably secure tools and other metallic objects in a vertical manner. It is a still further object of the present invention to provide a magnetic attachment element that is sturdy and not easily separated into multiple parts or easily broken. It is yet a further object of the present invention to provide a method of manufacturing a magnetic attachment element for use in connection with a pegboard, which overcomes the deficiencies of the prior art.

The present invention is directed to a magnetic attachment element for use in connection with a pegboard having multiple pegboard orifices extending through a pegboard body. The magnetic attachment element includes an attachment element body having at least one magnet in operational communication therewith for generating magnetic force therefrom. In addition, the magnetic attachment element includes one or more connector portions in operational communication with the attachment element body for attaching the attachment element body to the pegboard by engaging the connector portions to one or more of the pegboard orifices.

In a preferred and non-limiting embodiment, the attachment element body may include an attachment element orifice extending therethrough, such that the connector portion may engage with the attachment element orifice. Accordingly, the connector portion may be removable not only from the pegboard orifice, but may also be removable from the attachment element body. In addition, an end of the connector portion may include ribs, threads, ridges or other similar attachment structure that may allow it to be removably engaged with one or more of the pegboard orifices. The connector portion may removably attach the attachment element body to the pegboard.

In a further preferred and non-limiting embodiment, the attachment element body includes a base substrate having an inner base substrate area. The magnet is positioned at least partially within this inner base substrate area, and the attachment element body may include a cover element with a rim portion. The cover element would be positioned substantially adjacent the magnet, and the rim portion of the cover element would be partially embedded within the inner base substrate area. Further, an insert element may be provided and positioned in the attachment element body, such as by being embedded in the attachment element inner base substrate area. The insert element may be manufactured from a metal and/or a semi-metal, such that the magnetic force of the magnet is imparted upon and thereby magnetizes the insert element.

The present invention is further directed to a method of manufacturing an attachment element for use in connection with a pegboard having a plurality of pegboard orifices extending through a pegboard body. This method includes the step of at least partially surrounding one or more magnets with an attachment element body structure having one or more connector portions in operational communication with the attachment element body structure. Accordingly, the attachment element body structure is attachable to the pegboard by engaging the connector portion to one or more of the pegboard orifices.

The present invention is further directed to a method of manufacturing an attachment element for use in connection with a pegboard having a plurality of pegboard orifices extending through a pegboard body. The method includes the steps of: (a) embedding at least one magnet within an attachment element body structure having at least one connector portion in operational communication with the attachment element body structure; and (b) at least partially embedding a portion of a cover element within the attachment element body structure, where the cover element is positioned substantially adjacent the magnet embedded within the attachment element body structure. In addition, the attachment element body structure is attachable to the pegboard by engaging the connector portion to one or more pegboard orifices. In a further preferred embodiment, the cover element includes a rim portion, and the rim portion is at least partially embedded within the base substrate.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
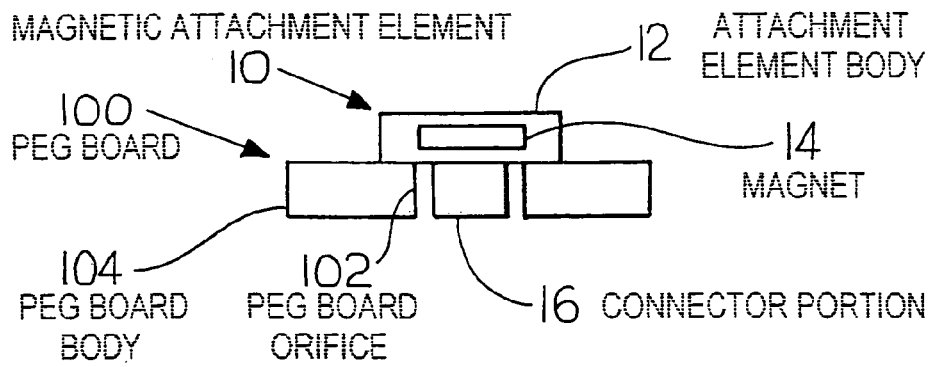
FIG. 1 is a schematic view of a magnetic attachment element according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is directed to a magnetic attachment element 10, as illustrated in various embodiments in FIGS. 1-7, as well as to a method of manufacturing such a magnetic attachment element 10. The magnetic attachment element 10, as described in detail herein, is specifically adapted for use in connection with a pegboard 100 having multiple pegboard orifices 102 extending through a pegboard body 104. Such a pegboard 100 construction is well known in the art and extensively used in many applications. Accordingly, the manufacture and use of such a pegboard 100 will not be described in any further detail herein.

As seen in FIG. 1, the magnetic attachment element 10 includes an attachment element body 12, and this attachment element body 12 includes one or more magnets 14 that are in operational communication with the body 12. As is known in the art, such magnets 14 generate a magnetic force for attracting metallic and other materials. The magnetic attachment element 10 also includes one or more connector portions 16 in operational communication with the attachment element body 12. The connector portion 16 allows the attachment element body 12 to be attached to the pegboard 100 by engaging the connector portion 16 to one or more of the pegboard orifices 102. In one preferred embodiment, the connector portion 16 allows the attachment element body 12 to be attached to the pegboard 100 in a removable manner, such that the magnetic attachment element 10 is usable and reusable in connection with different pegboards 100 and pegboard orifices 102.

Figure 2:
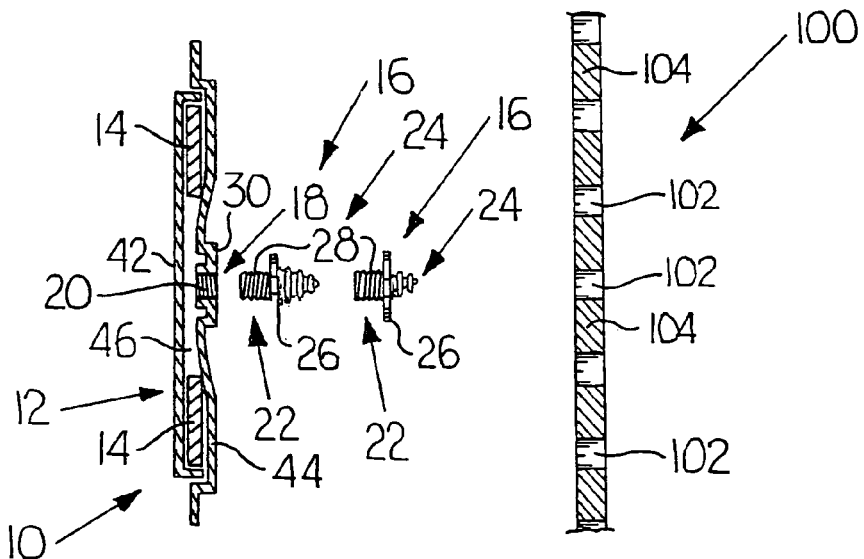
FIG. 2 is a side sectional view of one preferred embodiment of a magnetic attachment element according to the present invention.

In one preferred and non-limiting embodiment, as illustrated in FIG. 2, the attachment element body 12 includes an attachment element orifice 18 extending through the attachment element body 12. The connector portion 16 is engageable with the attachment element orifice 18. For example, as seen in FIG. 2, the attachment element orifice 18 may include an inner surface 20 or bore having threads disposed thereon. The connector portion 16, which includes a connector portion first end 22 and a connector portion second end 24, includes corresponding threads disposed on the connector portion first end 22. Accordingly, the connector portion 16 can be threadedly engaged within the attachment element orifice 18 via the threads on the inner surface 20 thereof.

In a further preferred and non-limiting embodiment, and as illustrated in FIG. 2, the connector portion 16 may also include a connector portion rim 26. The connector portion rim 26 extends circumferentially around and extends from a connector portion body 28. In this manner, when the connector portion first end 22 of the connector portion 16 is engaged with the attachment element orifice 18, the connector portion rim 26 abuts an attachment element body area 30, which surrounds the attachment element orifice 18.

The connector portion second end 24 includes appropriate structure in order to allow the connector portion 16 to be removably engaged with one or more of the pegboard orifices 102. In particular, the connector portion second end 24 may include ribs, threads and/or ridges that can engage with the pegboard orifices 102. Alternatively, the connector portion 16 may include some specifically designated attachment structure 32 allowing the connector portion 16 to be engaged with one or more of the pegboard orifices 102.

Figure 3:
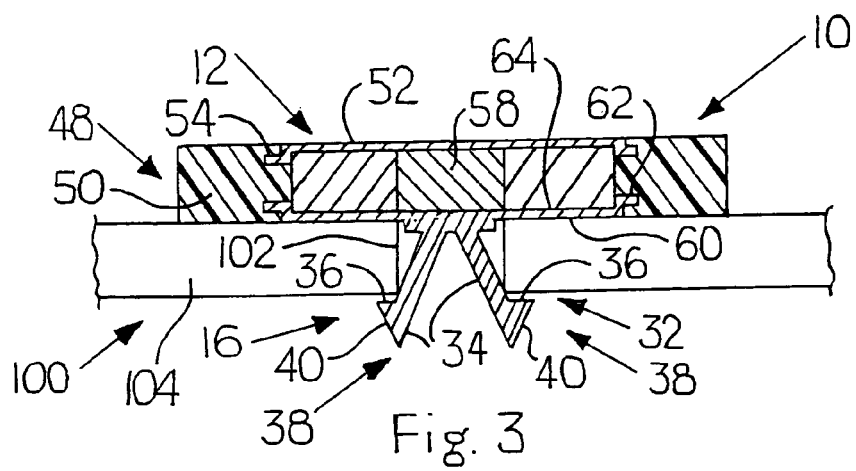
FIG. 3 is a side sectional view of a further preferred embodiment of a magnetic attachment element according to the present invention.
Figure 4:
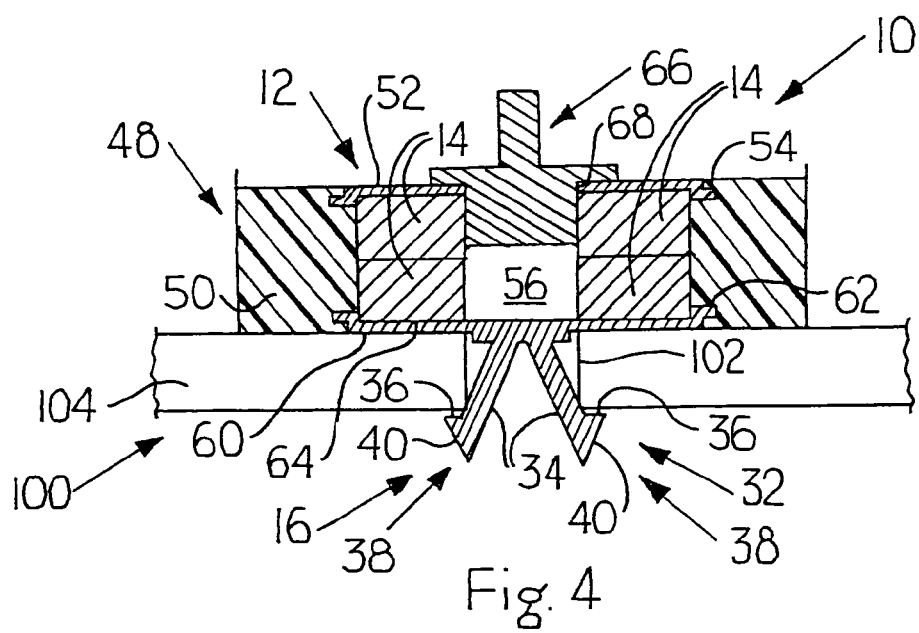
FIG. 4 is a side sectional view of a still further preferred embodiment of a magnetic attachment element according to the present invention.
Figure 5:
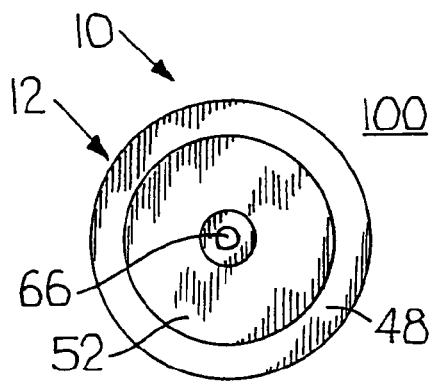
FIG. 5 is a top view of the magnetic attachment element of FIG. 4.

In one preferred and non-limiting embodiment, as illustrated in FIGS. 3 and 4, the attachment structure 32 may include one or more extension members 34 including an abutment surface 36 positioned or disposed adjacent an extension member end 38. In operation, when the attachment structure 32 is engaged with one or more of the pegboard orifices 102, the abutment surface 36 prevents the connector portion 16 from dislodgement from the pegboard orifice 102. Further, the extension member 34 may be elastic and include a user engagement surface 40 positioned or disposed near the end 38 of each extension member 34. Accordingly, when a user presses or pushes the engagement surface 40, thereby displacing the abutment surface 36, the user may then remove the connector portion 16 from the pegboard orifice 102. Such a structure is specifically useful in connection with multiple, and preferably two, extension members 34, where the user engagement surface 40 of each extension member 34 may be pressed towards each other to disengage the abutment surface 36 and, thereby, the connector portion 16 from the pegboard orifice 102.

In yet another preferred and non-limiting embodiment, as illustrated in FIG. 4, the extension members 34 may include multiple abutment surfaces 36 that are positioned along the extension member end 38. This, in turn, will provide the user with multiple user engagement surfaces 40. However, the use of multiple abutment surfaces 36 would allow for the use of the same magnetic attachment element 10 in connection with variously-sized and extending pegboard orifices 102. Depending upon the standard widths and depths of the pegboard orifices 102, in operation, the appropriate abutment surface 36 would be positioned and abut the pegboard body 104 upon connection. This provides the magnetic attachment element 10 additional flexibility for use in connection with varying pegboards 100. In particular, one set of abutment surfaces 36 would be used for a pegboard 100 having a pegboard orifice 102 with the standard dimensions of $3/16$ inch inside diameter and $1/8$ inch depth, and the second set of abutment surfaces 36 could be used with a pegboard 100 with a pegboard orifice 102 having a 9/32 inch inside diameter and a 1/4 inch depth.

In another preferred and non-limiting embodiment, and as illustrated in FIG. 2, the attachment element body 12 may include a front cover plate 42 and a back cover plate 44. The engagement of the front cover plate 42 and the back cover plate 44 forms an inner space 46. In this embodiment, the magnet 14 is positioned within this inner space 46, and preferably multiple magnets 14 are positioned therein. Further, the back cover plate 44 includes the above-discussed attachment element orifice 18 extending therethrough. Therefore, the connector portion 16 is engageable with the back cover plate 44 via this attachment element orifice 18.

As seen in FIG. 2, and as discussed above, the connector portion 16 may be removable from the attachment element body 12. This would allow the user to remove and engage an alternatively sized and shaped connector portion 16 to the attachment element body 12. As illustrated, in order to allow the magnetic attachment element 10 to be removably attached to a pegboard 100 including differently sized pegboard orifices 102 with different diameters, the user may simply remove one connector portion 16 and replace it with an appropriately-sized connector portion 16. FIG. 2 illustrates a removable connector portion 16 that may be capable of fitting a one-quarter inch pegboard orifice 102, but which may be removed and replaced with a connector portion 16 that fits a one-eighth inch pegboard orifice 102. However, it is also envisioned, and illustrated in FIGS. 3 and 4, that the connector portion 16 may be integrally formed with or permanently affixed to the attachment element body 12.

In another preferred and non-limiting embodiment, the attachment element body 12 is a base substrate 48 having an inner base substrate area 50. See FIGS. 3-7. The magnet 14 is positioned in or embedded within the inner base substrate area 50. In addition, the attachment element body 12 may include a cover element 52 having a rim portion 54. The cover element 52 is positioned substantially adjacent the magnet 14, and the rim portion 54 of the cover element 52 is at least partially embedded within the inner base substrate area 50. The base substrate 48 may be manufactured from a variety of materials. For example, the base substrate 48 may be manufactured from a plastic, a polymeric material, a metal, a semi-metal, a synthetic material, a moldable material, etc. In addition, the cover element 52 may be manufactured from a metal and/or a semi-metal. In this manner, the magnetic force of the magnet 14 would be imparted upon and magnetize the cover element 52. In a preferred embodiment, the base substrate 48 and the cover element 52 are manufactured as an integrated piece and/or a molded piece.

In operation, once the magnetic attachment element 10 is attached to the pegboard 100, a user may place multiple items on the pegboard by using the magnetic force of the magnetic attachment element 10 to attach a metal tool or similar object. As opposed to relying on gravity and a hook structure to hold a tool or other object on the pegboard 100, these typically metal and semi-metal-based tools and objects may be magnetically attached to the pegboard 100 via the magnetic attachment element 10, which provides for both easy attachment and easy removal therefrom.

As shown in FIGS. 3 and 4, in another embodiment, the magnet 14 includes a magnet orifice 56. In this embodiment, the magnet 14 is typically formed in a circular shape, and the magnet orifice 56 extends through a central portion of the magnet 14. Further, in this embodiment, an insert element 58 is positioned at least partially within the magnet orifice 56. For example, this insert element 58 may be manufactured from a metal and/or a semi-metal, such that the magnetic force of the magnet 14 is imparted upon and thereby magnetizes the insert element 58. It is also envisioned that the insert element 58 may be positioned within or embedded within the attachment element body 12 in a position that is substantially adjacent the magnet 14. For example, the insert element 58 may be a steel peg that is centrally positioned within the attachment element body 12. When the insert element 58 is used in connection with the cover element 52, both the insert element 58 and the cover element 52 are magnetized by the magnet 14 and provide a greater magnetic force emanating from the cover element 52, to which a user may attach a metal object.

As discussed above, the magnetic 14 may be in the form of a circular shape, with the magnet orifice 56 extending through a central portion of the magnet 14. However, a variety of differently shaped magnets 14 is envisioned. For example, the magnet may be in another geometric shape, such as a square or rectangle, and be positioned in or embedded within the inner base substrate area 50 on either side of a central area of the inner base substrate area 50, offset from a central area of the inner base substrate area 50, evenly spaced around the inner base substrate area 50, etc. For example, two spaced magnets 14 may be used on either side of the inner base substrate area 50, or three magnets 14 may be evenly spaced around the inner base substrate area 50. For example, three rectangular magnets 14 may be evenly spaced in a triangular shape around and within the inner base substrate area 50. However, any arrangement of magnets 14, together with any shape and size of magnet 14, is envisioned in order to achieve the appropriate magnetic force for tracking metallic and other similar materials.

The attachment element body 12 may also include a rear-securing element 60. This rear-securing element 60 may also, like the cover element 52, include a rim portion 62. Further, the rear-securing element 60 is positioned substantially adjacent a rear surface 64 of the magnet 14. In addition, the rim portion 62 of the rear-securing element 60 may be embedded within the inner base substrate area 50. In this manner, the magnet 14 is further secured within the base substrate 48.

Figure 7:
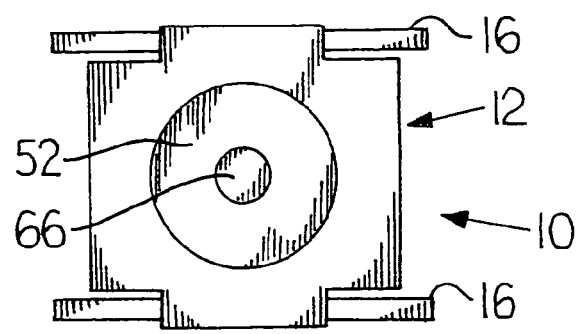
FIG. 7 is a top view of the magnetic attachment element of FIG. 6.

The cover element 52 may include a substantially planar surface, to which metal tools and objects may be easily attached. In addition, both the magnet 14 and the cover element 52 may be formed in a circular shape. However, such a preferred shape should not be considered as limiting. The magnetic attachment element 10, the attachment element body 12, the magnet 14, the cover element 52 and the other components and subcomponents of the magnetic attachment element 10 may be formed in a variety of shapes and sizes, as illustrated in FIG. 7. For example, the magnetic attachment element 10 may be in the shape of a square, a rectangle, an octagon, or other similar geometric shape.

As seen in FIG. 4, the magnetic attachment element 10 may also include a projecting element 66, which extends from the attachment element body 12. This projecting element 66 may be integrally formed with, permanently affixed to or otherwise removable from the attachment element body 12. For example, the projecting element 66 may extend through a cover element orifice 68 of the cover element 52 and further into the magnet orifice 56. If the projecting element 66 was made from a metallic or semi-metallic material, it is envisioned that the projecting element 66 may be removed from and inserted into the magnet orifice 56 via the cover element orifice 68. Therefore, the projecting element 66 may be provided in a variety of shapes and sizes to allow even further versatility and configurability in the magnetic attachment element 10 of the present invention. For example, the projecting element 66 may be in the form of a peg, an extension, a hook, a groove, a ridge or other similar attachment structure.

Figure 6:
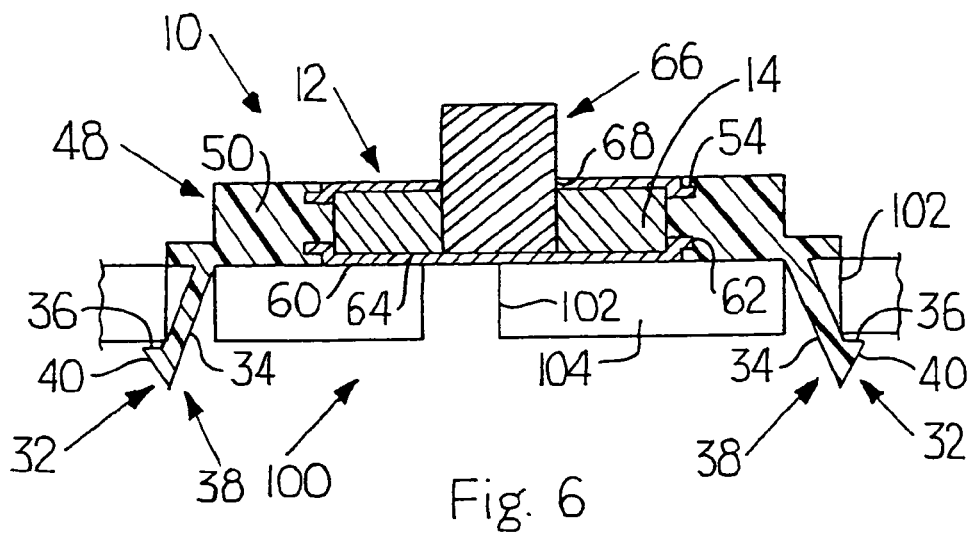
FIG. 6 is a side sectional view of a still further preferred embodiment of a magnetic attachment element according to the present invention.

As seen in FIGS. 6 and 7, in another preferred and non-limiting embodiment, the attachment structure 32 of the connector portion 16 is the above-discussed extension member 34. However, in this embodiment, and as opposed to inserting multiple extension members 34 through a single pegboard orifice 102, each pegboard orifice 102 includes a single extension member 34 that corresponds with a laterally displaced pegboard orifice 102. Accordingly, this attachment structure 32 operates as above for inserting and removing the attachment element body 12 from the pegboard 100. In operation, the user may simply press the user engagement surface 40 of corresponding extension members 34 toward each other and remove the attachment element body 12 from the pegboard 100.

The present invention is also directed to a further method of manufacturing the magnetic attachment element 10. This method includes the step of at least partially surrounding at least one magnet 14 with an attachment element body structure 12, which includes one or more connector portions 16 in operational communication with the attachment element body structure 12. As discussed above, the attachment element body structure 12 may be attachable (or removably attachable) to the pegboard 100 by engaging the at least one connector portion 16 with one or more of the pegboard orifices 102 that extend through the pegboard body 104.

The present invention is also directed to a method of manufacturing the magnetic attachment element 10. This method includes the steps of: (a) embedding the at least one magnet 14 within the attachment element body structure 12, where the attachment element body structure 12 includes a connector portion 16 in operational communication with the attachment element body structure 12; and (b) at least partially embedding a portion of the cover element 52 within the attachment element body structure 12, such that the cover element 52 is positioned substantially adjacent the at least one magnet 14 embedded within the attachment element body structure 12. Accordingly, the attachment element body structure 12 is attachable to the pegboard 100 by engaging the at least one connector portion 16 to one or more of the pegboard orifices 102.

In this manner, the present invention provides a magnetic attachment element 10 and methods of manufacturing such a magnetic attachment element 10 for beneficial use in connection with the pegboard 100. Using the connector portion 16, the attachment element body 12 is easily attachable to and removable from the pegboard 100 via the pegboard orifices 102. Further, the magnetic attachment element 10 is configurable and is attachable to and removable from the pegboard 100 in a variety of positions and applications. Metal and semi-metal tools and other objects may be attached to the magnetic attachment element 10 and are easily attachable to and removable therefrom using the magnetic force of the magnet 14.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A magnetic attachment element for use in connection with a peg board having a plurality of peg board orifices extending through a peg board body, the magnetic attachment element comprising:
   an attachment element body comprising:
      a base substrate having an inner base substrate area;
      at least one magnet positioned within the inner base substrate area such that the at least one magnet is embedded within the base substrate, the at least one magnet is in operational communication with the base substrate and is configured to generate a magnetic force therefrom for removably attaching a metallic object directly or indirectly to a cover element having a rim portion and positioned substantially adjacent the at least one magnet, wherein the rim portion of the cover element is at least partially embedded within the inner base substrate area; and
   at least one connector portion in operational communication with the attachment element body and removably attaching the attachment element body to the peg board by engaging the at least one connector portion to at least one of the plurality of peg board orifices.

2. The attachment element of claim 1, wherein attachment element body includes an attachment element orifice extending therethrough, the connector portion configured for engagement with the attachment element orifice.

3. The attachment element of claim 2, wherein the attachment element orifice includes an inner surface with threads disposed thereon, and the connector portion, which has a first end and a second end, includes corresponding threads disposed on the first end of the connector portion, such that the connector portion can be threadedly engaged with the attachment element orifice.

4. The attachment element of claim 3, wherein the connector portion includes a connector portion rim extending circumferentially around and extending from a connector portion body, such that when the first end of the connector portion is engaged with the attachment element orifice, the rim abuts an attachment element body area surrounding the attachment element orifice.

5. The attachment element of claim 3, wherein the second end of the connector portion includes at least one of ribs, threads, ridges and an attachment structure configured to removably engage the connector portion with at least one of the plurality of peg board orifices.

6. The attachment element of claim 3, wherein the attachment structure comprises at least one extension member having an abutment surface disposed substantially adjacent an end of the extension member, such that when the attachment structure is engaged with at least one of the plurality of peg board orifices, the abutment surface prevent the connector portion from dislodgment.

7. The attachment element of claim 6, wherein the extension member is elastic and include a user engagement surface disposed substantially adjacent the end of each extension member, such that a user may press the engagement surface, thereby displacing the abutment surface, and remove the connector portion from the peg board orifice.

8. The attachment element of claim 1, wherein the connector portion is at least one of integrally formed with, permanently affixed to and removable from the attachment element body.

9. The attachment element of claim 1, wherein the base substrate is manufactured from at least one of a plastic, a polymeric material, a metal, a semi-metal, a synthetic material and a moldable material.

10. The attachment element of claim 1, wherein the cover element is manufactured from at least one of a metal and a semi-metal, such that magnetic force of the at least one magnet is imparted upon and thereby magnetizes the cover element.

11. The attachment element of claim 1, wherein the base substrate and the cover element are manufactured as at least one of an integrated piece and a molded piece.

12. The attachment element of claim 1, wherein the at least one magnet includes a magnet orifice extending therethrough.

13. The attachment element of claim 12, wherein an insert element is positioned at least partially within the magnet orifice.

14. The attachment element of claim 13, wherein the insert element is manufactured from at least one of a metal and a semi-metal, such that magnetic force of the magnet is imparted upon and thereby magnetizes the insert element.

15. The attachment element of claim 1, wherein the attachment element body further includes a rear-securing element including a rim portion and positioned substantially adjacent a rear surface of the at least one magnet, wherein the rim portion of the rear-securing element is at least partially embedded within the base substrate inner area, thereby further securing the at least one magnet within the base substrate.

16. The attachment element of claim 15, wherein the connector portion is at least one of integrally formed with, permanently affixed to or removable from the rear-securing element.

17. The attachment element of claim 1, wherein the cover element includes a substantially planar surface.

18. The attachment element of claim 1, wherein at least one of the magnet and the cover element are formed in a substantially circular shape.

19. The attachment element of claim 1, wherein the base substrate is manufactured from at least one of a plastic, a polymeric material, a metal, a semi-metal, a synthetic material and a moldable material.

20. The attachment element of claim 1, wherein the attachment element includes at least one projecting element extending from the attachment element body, the projecting element at least one of integrally formed with, permanently affixed to or removable from the attachment element body.

21. The attachment element of claim 1, further comprising a plurality of connector portions in operational communication with the attachment element body and configured to removably attach the attachment element body to the peg board by engaging at least one of the plurality of connector portions to at least one of the plurality of peg board orifices.

22. The attachment element of claim 21, wherein an end of each connector portion includes at least one of ribs, threads, ridges and an attachment structure configured to removably engage the connector portion with at least one of the plurality of peg board orifices.

23. The attachment element of claim 22, wherein the attachment structure comprises at least one extension member having an abutment surface disposed substantially adjacent an end of the extension member, such that when the attachment structure is engaged with at least one of the plurality of peg board orifices, the abutment surface prevent the connector portion from dislodgment.

24. The attachment element of claim 23, wherein the extension member is elastic and include a user engagement surface disposed substantially adjacent the end of each extension member, such that a user may press the engagement surface, thereby displacing the abutment surface, and remove the connector portion from the peg board orifice.

25. The attachment element of claim 1, wherein an end of the connector portion includes at least one of ribs, threads, ridges and an attachment structure configured to removably engage the connector portion with at least one of the plurality of peg board orifices.

26. The attachment element of claim 25, wherein the attachment structure comprises at least one extension member having an abutment surface disposed substantially adjacent an end of the extension member, such that when the attachment structure is engaged with at least one of the plurality of peg board orifices, the abutment surface prevent the connector portion from dislodgment.

27. The attachment element of claim 26, wherein the extension member is elastic and include a user engagement surface disposed substantially adjacent the end of each extension member, such that a user may press the engagement surface, thereby displacing the abutment surface, and remove the connector portion from the peg board orifice.

28. The attachment element of claim 1, wherein the magnet includes a magnet orifice extending therethrough, the attachment element further comprising an insert element positioned at least partially within the magnet orifice.

29. The attachment element of claim 28, wherein the insert element is manufactured from at least one of a metal and a semi-metal, such that magnetic force of the magnet is imparted upon and thereby magnetizes the insert element.

30. The attachment element of claim 1, wherein the at least one connector portion is configured to removably attach the attachment element body to the pegboard.

31. A method of manufacturing an attachment element for use in connection with a peg board having a plurality of peg board orifices extending through a peg board body, the method comprising:

surrounding at least one magnet with a base substrate of an attachment element body such that the at least one magnet is at least partially embedded within the base substrate, whereby the at least one magnet generates a magnetic force therefrom for removably attaching a metallic object directly or indirectly to a cover element having a rim portion positioned substantially adjacent the at least one magnet, wherein the rim portion of the cover element is at least partially embedded within an inner base substrate area of the base substrate, wherein the attachment element has at least one connector portion in operational communication with the attachment element body structure, such that the attachment element body structure is removably attached to the peg board by engaging the at least one connector portion to at least one of the plurality of peg board orifices.

32. The method of claim 31, wherein the at least one connector portion is at least one of integrally formed with, permanently affixed to or removable from the attachment element body structure.

33. The method of claim 31, wherein the attachment element body structure is manufactured from at least one of a plastic, a polymeric material, a metal, a semi-metal, a synthetic material and a moldable material.

* * * * *